United States Patent [19]

Peterson et al.

[11] Patent Number: 5,446,652
[45] Date of Patent: Aug. 29, 1995

[54] CONSTRAINT KNOWLEDGE IN SIMULATION MODELING

[75] Inventors: David W. Peterson, Harvard; Robert L. Eberlein, Belmont, both of Mass.

[73] Assignee: Ventana Systems, Inc., Harvard, Mass.

[21] Appl. No.: 53,613

[22] Filed: Apr. 27, 1993

[51] Int. Cl.[6] .............................................. G06F 17/00
[52] U.S. Cl. ................................................... 364/578
[58] Field of Search ............... 364/578, 149, 151, 500, 364/578, 579, 802, 806; 395/54, 67, 920

[56] References Cited

U.S. PATENT DOCUMENTS

| | | | |
|---|---|---|---|
| 4,471,447 | 9/1984 | Williams et al. | 364/151 |
| 5,163,016 | 11/1992 | Har'el et al. | 364/578 |
| 5,291,427 | 3/1994 | Loyer et al | 364/578 |

OTHER PUBLICATIONS

Bratley; "A guide to simulation" Springer–Verlag (New York) 1983; pp. 8–11.
Levary; "Hybrid Expert System" Expert Systems, May 1988, vol. 5, No. 2
Whitehead et al; "Hoist: A Second Generation Expert System Based on Qualitative Physics"; AI Mag. 1990.
Raghunalan; "A planning Aid: An Intelligent Modeling System For Planning Problems Based on Contraint Satisfaction"IEEE 1992.
"Constraint Knowledge for Construction Scheduling"; Waugh et al; IEEE. 1990.

*Primary Examiner*—Ellis B. Ramirez
*Attorney, Agent, or Firm*—Fish & Richardson

[57] ABSTRACT

A computer-based method for aiding a user to develop a computer-based simulation model of the kind which simulates a multiple variable system using a suite of equations. Stored, user-entered constraint knowledge defines possible conditions of variables of the multiple variable system and corresponding expected consequences on variables of the system. The possible conditions are automatically applied to the suite of equations to produce test consequences on variables of the system. Then the test consequences are automatically analyzed against the expected consequences as an indication of the validity of the simulation model.

7 Claims, 6 Drawing Sheets

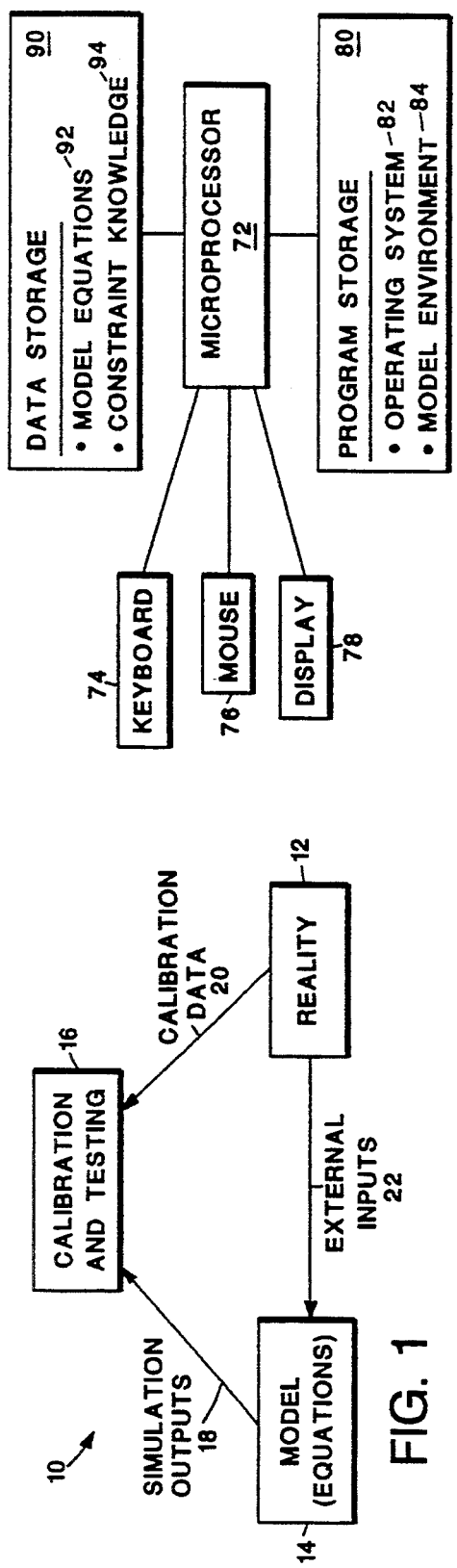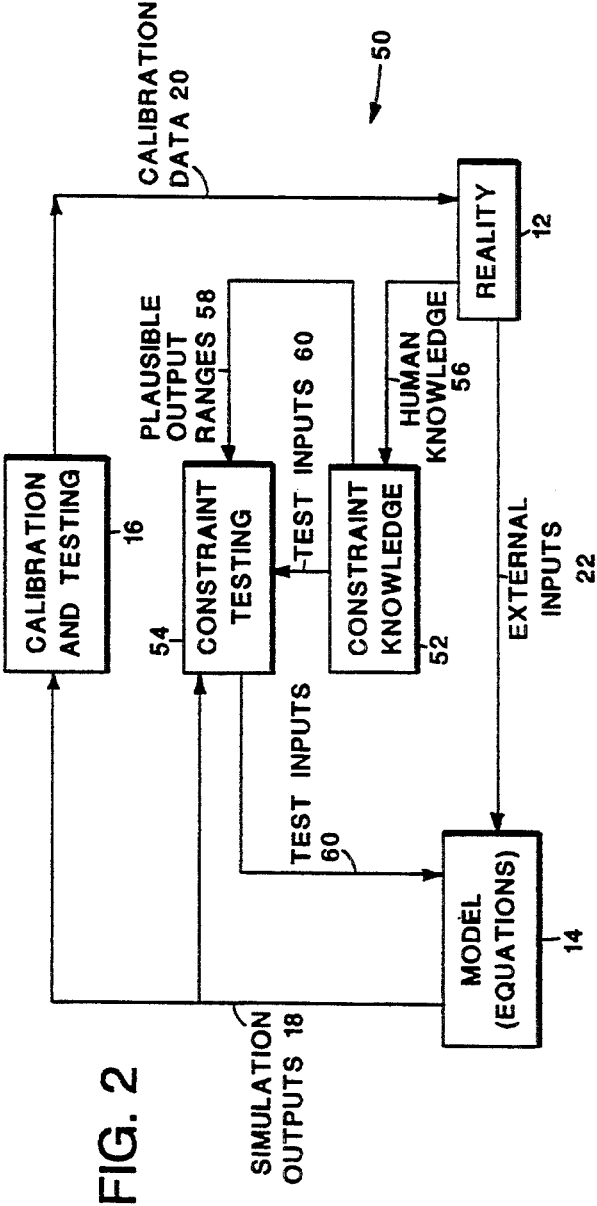

```
        water = INTEG ( inflow - outflow, 10)
                ~ units: gallons
120 →           ~ definition: The amount of water in a bathtub. |
        inflow = 10
                ~ units: gallons / minute
122 →           ~ definition: The rate at which water flows into the bathtub |
        outflow = Water / TIME_TO_DRAIN
                ~ units: gallons / minute
124 →           ~ definition: The rate at which water flows out of the bathtub |
        TIME_TO_DRAIN = 2
                ~ units: minutes
126 →           ~ definition: The average time water stays in the bathtub |

****************************************
        Constraints
****************************************~| no_water_no_outflow
                THE_CONDITION water = 0    ← 130
                IMPLIES outflow = 0 ← 132
128 →           ~
                ~ If there is no water in the tub, none should flow out. |
```

FIG. 5

```
        %token THE_CONDITION
        %token IMPLIES
        %token INTEG

/* expressions */ expr:       name              /* just a name */        { }
                |   number            /* just a number */      { }
                |   expr '*' expr     /* times */              { }
                |   expr '/' expr     /* divided */            { }
                |   expr '+' expr     /* plus */               { }
                |   expr '-' expr     /* minus*/               { }
                |   expr '=' expr     /* conditional = */      { } ;

/* statements */ st:         name '=' expr  /* assignment */
                |   name '=' INTEG '(' expr ',' expr ')' ;  /* state variable */

/* constraints */
        cnstr:      name THE_CONDITION st IMPLIES expr
                    /* a fully specified constraint */
```

Note that INTEG, THE_CONDITION, and IMPLIES would need to be returned by lex on encountering the associated keywords.

FIG. 6

1. Push the variable "water" onto the stack.
2. Push the number "0.0" onto the stack.
3. Test for equality of the top two stack items;
4. On failure, jump to END.
5. Push the variable "outflow" onto the stack.
6. Push the number "0.0" onto the stack.
7. Test for equality of the top two stack items;
8. On failure, jump to END.
9. Call the message routine for displaying and storing a constraint violation message.
10 :END

FIG. 8

```
101.    input = 10                      ! constant
102.    TIME_TO_DRAIN = 2               ! constant
103.    TIME_STEP = .5                  ! constant
104.    FINAL_TIME = 10                 ! constant
105.    Time = 0                        ! initialize
106.    Water = 10                      ! Initialize
107.    output = Water / TIME_TO_DRAIN           ! Starting value
108.    While Time <= FINAL_TIME                 ! Main loop
109.        delwater = input - output
110.        Water = Water + TIME_STEP * delwater    ! Integrate
111.        Time = Time + TIME_STEP
112.        output = Water / TIME_TO_DRAIN
113.    END While
```

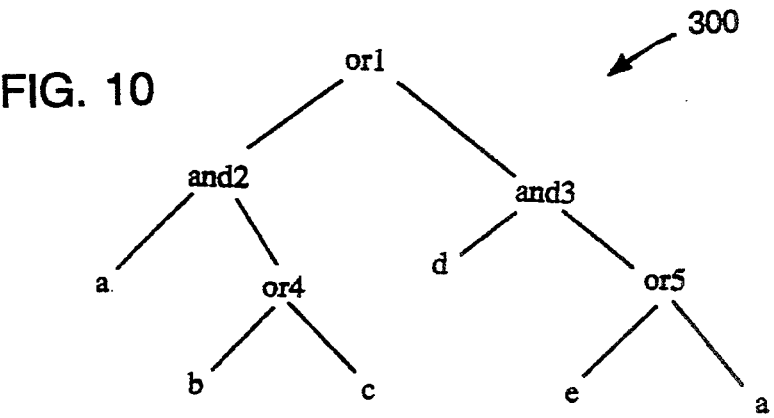

| $V_I$ | $V_{I+1}$ | PREV | NEXT | Set S = m(t) at t = $T_{I+1}$ ? |
|---|---|---|---|---|
| none (i=0) | number | $V_{I+1}$ | $V_{I+1}$ | no |
| none (i=0) | * | m(t) | m(t) | no |
| none (i=0) | - | m(t) | m(t) | yes |
| number | number | $V_I$ | $V_{I+1}$ | no |
| number | * | $V_I$ | m(t) | no |
| number | - | $V_I$ | m(t) | yes |
| * | number | m(t) | $V_{I+1}$ | no |
| * | * | m(t) | m(t) | no |
| * | - | m(t) | m(t) | yes |
| - | number | S | $V_{I+1}$ | no |
| - | * | S | m(t) | no |
| - | - | S | S | no |
| number | none (i=N) | $V_I$ | $V_I$ | no |
| * | none (i=N) | m(t) | m(t) | no |
| - | none (i=N) | S | S | no |

CONSTRAINT KNOWLEDGE IN SIMULATION MODELING

BACKGROUND OF THE INVENTION

This invention relates to testing simulation models.

Referring to FIG. 1, in a typical simulation environment 10, reality 12 is simulated by a model 14 of equations composed by the simulation developer. The model can be viewed as having a set of inputs and a set of outputs with the equations controlling what sequence of outputs will be generated for a given sequence of inputs.

To validate a model, calibration and testing procedures 16 are used to compare simulation model outputs 18 with calibration data 20. The simulation model outputs 18 are generated by feeding external inputs 22 (representative of reality) to the model equations. The calibration data 20 represent real output data that correspond to the external inputs 22. If a sufficient range of simulation outputs square with the corresponding calibration data, the model 14 is said to be validated. Otherwise, the developer attempts to improve the performance of model 14 by modifying its equations.

SUMMARY OF THE INVENTION

In general, in one aspect, the invention features a computer-based method for aiding a user to develop a computer-based simulation model of the kind which simulates a multiple variable system using a suite of equations. Stored, user-entered constraint knowledge defines possible conditions of variables of the multiple variable system and corresponding expected consequences on variables of the system. The possible conditions are automatically applied to the suite of equations to produce test consequences on variables of the system. Then the test consequences are automatically analyzed against the expected consequences as an indication of the validity of the simulation model.

Preferred embodiments of the invention include the following features. A user interface is provided that includes a constraint language for enabling a user to express constraint definitions as part of the constraint knowledge. The constraint language includes a condition token for indicating the presence in a constraint definition of a statement about a condition of a variable, and a consequences token for indicating the presence in a constraint definition of a statement about a consequence on another variable of the system. The constraint language permits the user to express statements about the condition of a variable in the form of a variable name, followed by an expression, followed by an expression or by a token and an expression. The constraint language permits the user to express statements about the conditions which are logical concatenations of simpler condition statements. The constraint language also permits the user to express time transition statements about the conditions and consequences which indicate how variables change over time.

In general, in another aspect, the invention features passive testing of the validity of the simulation model. While running the simulation model, a determination is made when values of variables satisfy conditions defined in the constraints. Under these conditions, a determination is made when values of variables do and do not satisfy corresponding consequences defined in said constraints.

In general, in another aspect, the invention features active testing of the validity of a simulation model in which equations, derived from the constraint knowledge, forces the specified conditions to exist. The equations are automatically appended to the simulation model. Then, while running the simulation model a determination is made when values of variables do and do not satisfy corresponding consequences defined in the constraints.

The invention permits simple specification and storage of constraint knowledge and automatic application of the constraint knowledge to the development and validation of simulation models. The model developer's productivity and the quality of the resulting models are improved. Understanding and communication of the models and model results is also aided by the explicit recitation and storage of the constraint knowledge.

Other advantages and features will become apparent from the following description and from the claims.

DESCRIPTION

We first briefly describe the drawings.

FIG. 1 is a block diagram of simulation model testing.

FIG. 2 is a lock diagram of simulation model testing using constraint knowledge.

FIG. 3 is a block diagram of a computer system.

FIG. 5 an example of a simulation model and a related constraint.

FIG. 6 shows definitions of the elements of the language used in FIG. 5.

Figure 7:
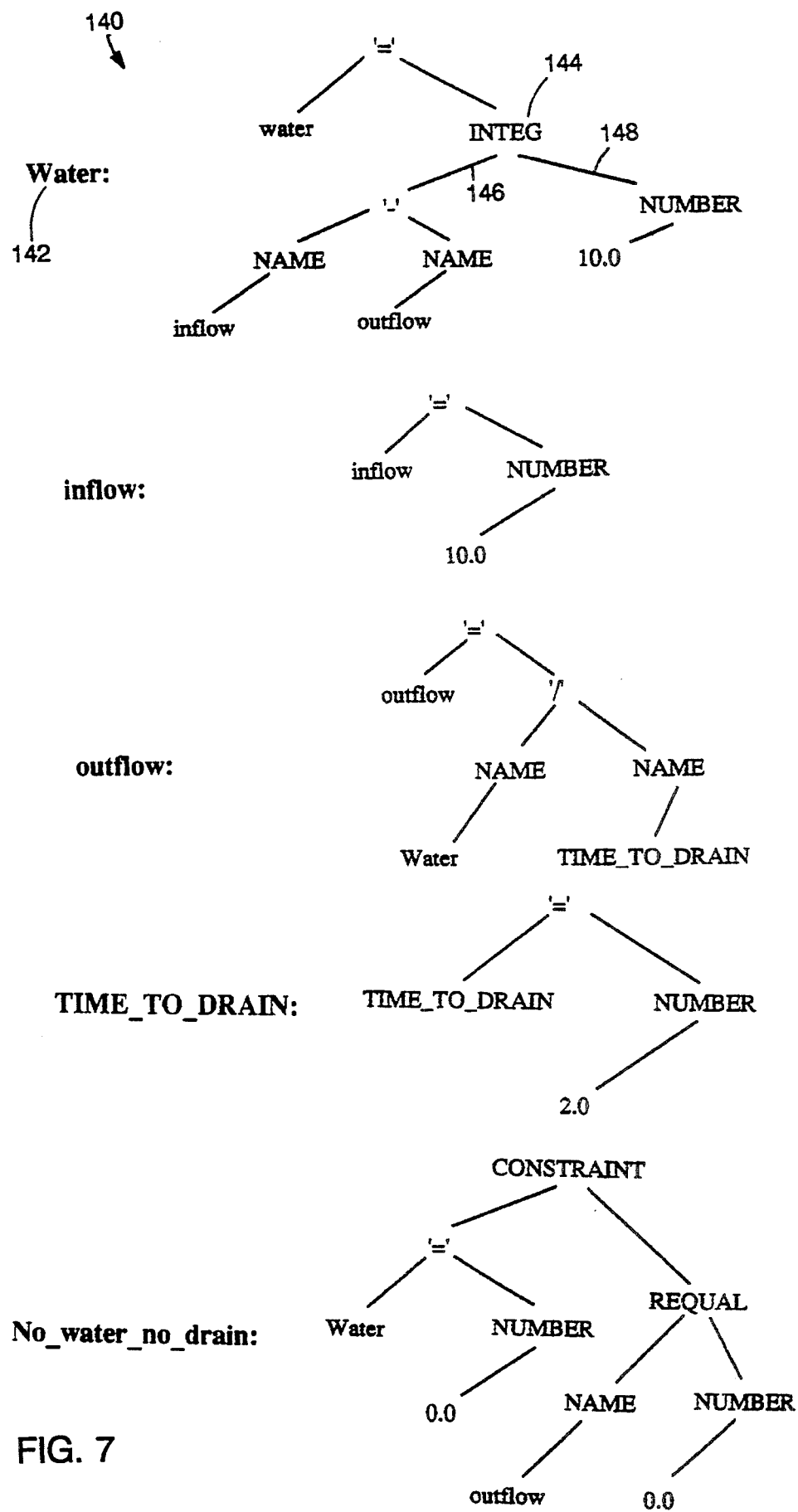

FIG. 7 shows parse trees for the model and constraint of FIG. 5.

FIG. 8 is a stack-oriented sequence for a passive constraint test.

FIG. 9 shows an instruction sequence corresponding to the model of FIG. 5.

FIG. 10 shows an equation tree for a complex condition.

Figures 11, 12:
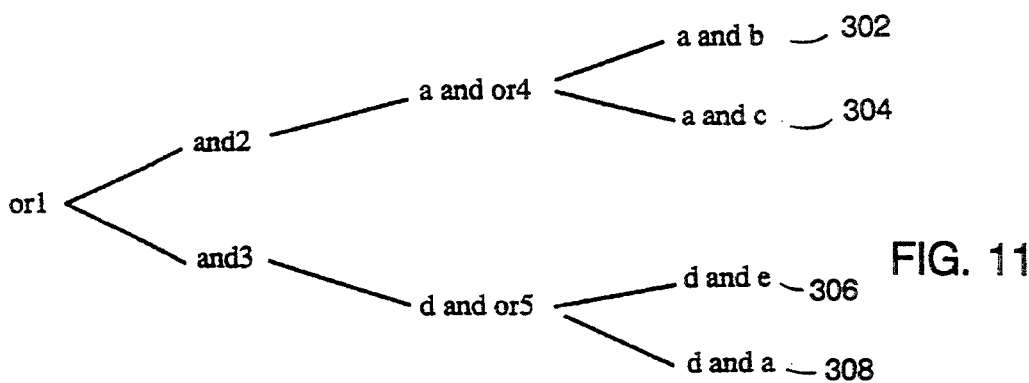

FIG. 11 a translation of the tree of FIG. 10.

FIG. 12 shows a table of variables PREV and NEXT.

The selection of equations for inclusion in a simulation model is based on (among other things) the developer's knowledge of how reality will behave, and hence how the model should behave. The knowledge includes the expected behavior under such scenarios as inputs which have extreme values, perfectly balanced inputs, and sudden changes in an input. We define each expected behavior under such a scenario as a "constraint" and a body of one or more constraints as "constraint knowledge". A correct simulation model should conform fully to the constraint knowledge.

For example, a simulation model of a factory should conform to the constraint knowledge that, in a real factory, if labor and machinery inputs are forced to zero, then the production output variable should go to zero.

Constraint knowledge stands separate from the model to which it is applied for purposes of validation. Constraint knowledge defines validity by placing qualitative bounds or ranges on the valid mathematical behavior of a model.

In development of conventional simulation models, constraint knowledge typically is unstated, residing only in the minds of modelers or testers of models (or occasionally in off-line documents).

Referring to FIG. 2, in a simulation environment 50 according to the invention, a separate body of constraint knowledge 52 is explicitly generated and stored, and the model is subjected to formal constraint testing 54, using the constraint knowledge. The constraint testing supplements the usual calibration and testing 16.

The constraint knowledge 52 is derived from human knowledge 56 of the behavior of reality 12. The constraint knowledge defines plausible ranges 58 of output values for corresponding test inputs 60. During testing, those inputs are fed to the model 14 and the resulting simulation outputs 18 are tested against the corresponding plausible output ranges 58. If the plausible ranges are satisfied for all constraint knowledge, the model is validated. Otherwise, the developer may use information about which constraints were not satisfied and which equations led to the failure as the basis for modifying the model. Because constraints force models into behavior regions not normally encountered, the tests of the model's conformance to the constraint knowledge powerfully extend the notion of model validation beyond what is possible by conventional statistical data comparison.

Referring to FIG. 3, the invention could, in one example, be implemented on a personal computer 70 having a microprocessor 72 and the usual input/output devices including a mouse 74, a keyboard 76, and a display 78. Program storage 80 holds an operating system (e.g., UNIX or DOS/Windows) 82, simulation model environment software 84 (e.g., the Vensim simulation environment available from Ventana Systems, Harvard, MA and described in the Vensim Reference Manual Technical Release 1.50, 1988, 1991, attached as Appendix F, also available from Ventana, and incorporated by reference). Data storage 90 holds data including model equations 92 and constraint knowledge 94.

Figure 4:
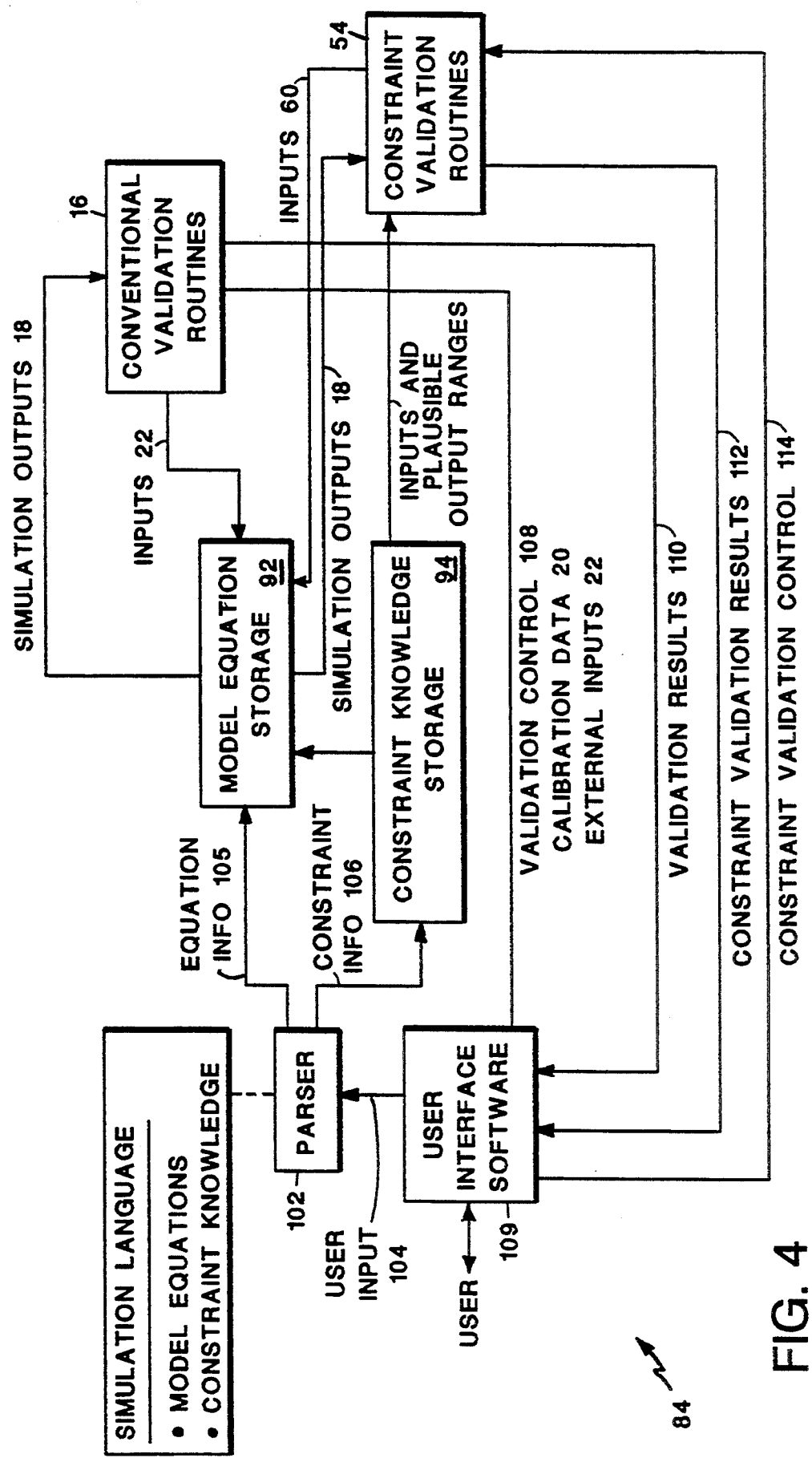
FIG. 4 is a block diagram of simulation model environment software.

Referring to FIG. 4, the simulation model environment 84 defines a simulation language 100 (e.g., the Vensim language in the case of an implementation based on the Vensim environment; the language is defined in the Vensim Reference Manual) which permits a user to define the equations of a model. In the invention, the simulation language is expanded to permit a user to express constraint knowledge.

The simulation model environment includes a parser 102 for receiving user statements and parsing them to derive information about the model equations and the constraint knowledge. The resulting equation information 105 and constraint information 106 are held in storage.

The environment 84 also includes user interface software 109 which provides interaction with the user via the mouse, keyboard, and display. Conventional validation routines 16 receive validation control information 108 from the user as well as calibration data 20 and external inputs 22. Routines 16 return validation results 110 to the user.

Constraint validation routines 54 use information from the constraint knowledge storage and constraint validation control commands 114 from the user as the basis for constraint testing the model 92. Constraint validation results 112 are returned to the user.

The Language

Referring to FIG. 5, an example of a simulation model and a related constraint will serve to illustrate the syntax of the language and the parsing of statements. The example model simulates the level of water in a bathtub. The first four statements 120, 122, 124, and 126 represent equations in the model; the final statement 128 represents the constraint knowledge (in this case a single simple constraint).

Each equation statement includes an equation (or an inequality) having a single output variable on the left side and some combination of input variables or constants on the right side. The equation is followed by a specification of the units of the output variable and a definition of what the equation represents.

The constraint statement 128 begins with a name for the constraint (in this case, the name is "no_water_no_outflow"). Each constraint statement then includes a set of input specifications 130. Each input specification is introduced by "THE_CONDITION" and then includes an equality or inequality. On the left side is a name of one of the variables and on the right side is a condition for that variable. In this case, there is a single input specification. The next line in the constraint statement is an output specification 132. An output specification typically represents an equality or inequality with a value on the right side and a variable on the left side. The identifier IMPLIES identifies the line as an output specification.

Parsing of the Language

The model equation storage 92 (FIG. 4) stores model equation and constraint information conceptually as so-called equation trees. Parser 102 provides lexical and syntactical analysis of the equation statements and constraint statements of a model and produces a corresponding equation tree. Information about parsing techniques may be found in standard references, such as Chapters 3 and 4 of Aho, et al., *Compilers: Principles, Techniques and Tools*, Addison-Wesley Publishing Company, Reading, Mass. 1986, incorporated by reference.

Standard UNIX programs lex and yacc are very effective for parsing model statements, but other techniques could be used. In the course of parsing, the identifiers THE_CONDITION and IMPLIES are treated as keywords. That is, the computer program assumes that these identifiers are reserved for defining a constraint, rather than having been created by the model developer as variable names. The statements occurring between the keywords (i e., "water=0" in the example) and after IMPLIES (i e., "outflow=0" in the example) are treated as ordinary statements. Using the notation of yacc, the expressions found in equations and constraints can be represented as shown in FIG. 6. Note that INTEG, THE_CONDITION, and IMPLIES would need to be returned by lex on encountering the associated keywords.

Two-branch parse trees are an effective way of recording equation information and constraint knowledge. Referring to FIG. 7, each equation tree 140 is associated with a symbol 142, which corresponds to the left side of the model equation or to the name of the constraint. Each node 144 of a tree has a type, a left branch 146 or terminal, and possibly a right branch or terminal 148. The node types may be, e.g., an expression (for example, =), or a special node type such as NAME, INTEG, CONSTRAINT, REQUAL (relational equality), or NUMBER. Terminals may include constants (e.g., 10.0) and names (e.g., inflow), with names represented by addresses or indices (not shown) which point to the location of the value in memory. Each of the trees of FIG. 7 represents one of the statements in FIG. 5 and is complete in the sense that it contains the same information as and is sufficient for reconstruction of the equation or constraint.

Constraint Validation Routines

Constraints may be tested actively or passively. The two methods are similar, except that in active testing the CONDITION part of the constraint is forced to occur. In actively testing the constraint of FIG. 5, for example, water is forced to a value of 0. In passive mode, the constraint is tested only if the condition happens to occur in the normal course of running the simulation model. In the example of FIG. 5, the constraint test would await an occasion (if ever) during the running of the model when water becomes 0. At that time, the IMPLIES part of the constraint would be tested. In either active or passive testing, if the IMPLIES statement is satisfied, then the model is consistent with the constraint knowledge; otherwise the model has violated the constraint, indicating a probable error in the model or an error in the constraint (or an error in software).

Passive Constraint Testing

Most constraints would, in active mode, imply assignment of values in contradiction to some of the existing model equations. For passive testing, it is necessary to monitor whenever the conditions are true. To do this, the conditions must be translated into a relational test. The translation is performed before the simulation model is run. In the example of FIG. 7, the constraint is translated into the stack-oriented sequence of operations shown in FIG. 8. The stack-oriented sequence may be implemented as machine code or as code which can be run via an interpreter. It is created by recursive traversal of the parse tree for the constraint with the assignment "=" being interpreted not as an assignment operation but as a relational equality test at the time the stack-oriented sequence is created.

Active Constraint Testing

Passive testing of constraints may leave constraints untested because the model, when run, may never reach the defined CONDITION. For the example of FIG. 5, the variable water will asymptotically approach, but never reach, 0.0, and, in passive mode, the defined constraint will never be tested. In active mode, in order to force the CONDITION to be satisfied, additional equations (derived from the constraint statements) are automatically appended to the simulation model.

The choice to append, rather than replace equations, was made to simplify the process of returning to the model's original set of equations following the active testing, to allow normal simulation runs to proceed, to permit easy substitution of other constraints for testing, and to allow the passive testing of constraints. Because it is often necessary to perform multiple simulations, each appending some number of changes, this is a desirable feature. Care must be taken in ordering equations for computation, because the addition of equations may change the dependencies of one equation on the results of other equations. Care must also be taken with "level" variables (also known as state variables) which normally use a different computation logic, as discussed below.

Normally, in order to run the simulation model of FIG. 5, it would be translated into the sequence of equations shown in FIG. 9 (assuming that integration—INTEG—is performed by the Euler method). To test the constraint in FIG. 5, the following line would be inserted between lines 111 and 112 of the sequence:

111.5 Water=0

Line 111.5 overrides the effect of equations 109 and 110, by forcing water to 0, thus forcing the constraint to be true.

Because of the way the constraints are stored in the parse tree of FIG. 7, it is easy to determine what equation to append. The left side of the tree is converted to a valid set of operations. The actual operations are encoded in a stack format like the one shown in FIG. 8.

Complex Constraint Conditions

The example of FIG. 5 includes only a single simple constraint condition. More complex constraint conditions (including those which define ranges of values) may also be tested, for example:

((Water>=0 and Water<=20) or Water=30).

Passive testing of such complex constraint conditions is straightforward because they simply require the joint testing of the conditions of the constraint.

Active testing of complex conditions requires determining the various ways the conditions might be true, then constructing additional equations to be appended to the model.

The first condition (0<Water<20) is tested by appending to the model equations that test the normally computed value of water, and achieve the following logic:

if Water<0, then Water=0.
if Water>20, then Water=20.

This retains the normally computed value of Water if it is within the range defined by the first condition, otherwise it replaces the value with a value which is at one of the boundaries of the defined range of the condition.

The second condition is tested separately by appending the equation:

Water=30.

More generally, consider a complex condition of the form (a AND (b OR c)) OR (d AND (e OR a))

where a, b, c, d, and e are simple condition expressions of the sort Water>0. Testing the complex condition requires passing down the equation tree for that condition, branching at every logical OR and testing each side separately. The process is done recursively by traversing the equation tree and recording terminals, which may need to be combined with an AND statement.

Referring to FIGS. 10 and 11, the equation tree 300 corresponding to the complex condition recited above is thus translated into four separate conditions 302, 304, 306, and 308 required to fully test the complex constraint condition. The four conditions are then tested in four successive simulation runs.

The successive runs may be performed automatically by means of software, for example, the test_input_count and test_input_add routines shown in Appendix E, incorporated by reference.

The TIME_TRANSITION function

A key feature of active constraint testing is that the conditions may specify how something must happen in response to an externally-imposed test condition. The externally-imposed condition may involve a combination of the time profile of the simulation with no active constraints (hereafter called the usual simulation) combined with externally-specified values. Further, the externally-specified values may be absolute or relative. Examples of such conditions are:

"usual simulation until time 10, then hold variable X at its then current value"

"usual simulation, but at time 10, cause the variable X to change linearly toward 0,
reaching 0 at time 12, staying at 0 thereafter."

One tool which enables such time varying conditions is the TIME_TRANSITION function used in stating the constraint. In general, a time transition begins with usual simulation, changes to an arbitrarily defined condition over a period of time, and possibly returns to the usual simulation.

As a simple example, consider the following constraint for the model of FIG. 5.

Constraint_using_time_transition
THE_CONDITION
Water = TIME_TRANSITION (10,20,-,0)
IMPLIES
Outflow ⇐== TIME_TRANSITION (10,20,-,0)

This constraint means simply that the following test is applied. The bathtub is allowed to follow the normal course of its simulation through successive time instants until time=10. Between time=10 and time=20, the level of Water is forced (as if by powerful and precise pumps) to "ramp" from whatever value it has at time 10 to a level of 0 at time 20. Under these forced ("constrained") conditions, it is expected that the outflow will fall to 0 over the same time period, or its descent will precede the descent of the Water. That is, the outflow may stop before the level is zero, but there should be no outflow if there is no water.

Note that although the relative shapes of the two time functions may be asserted, the value of neither the water level nor the outflow is known in advance. The TIME_TRANSITION function is powerful because it permits one to define a function shape, including unknown values to be determined by the outcome of the simulation.

The general form of the TIME_TRANSITION function is:

var=TIME_TRANSITION ($T_1, T_2, T_3, \ldots T_N, V_1, V_2, V_3, \ldots V_N$)

The T's must all be given numerical values in ascending order, corresponding to times, expressed in the same units as for the simulation model. Each $V_i$ defines a value of var at the corresponding $T_1$. Each $V_i$ may take on three kinds of values: numerical, or one of two special symbols: '—' and '*'.

Both symbols refer to the usual simulation value at the time specified by the time value. The symbol '—' means "sample the value of the simulation variable at the corresponding time $T_i$, and hold it constant." Beginning at time $T_i$, the value of var defined by the TIME_TRANSITION function is the convex combination of the sampled value and the value implied by the next value, $V_i+1$. That is, the output of the function is:

$$f(t)*V_i+1+(1-f(t))*S$$

where S is the sampled value implied by the '—' as the value of $V_i$ and $$f(t)=(t-T_i)/(T_i+1-T_i)$$

The symbol '*' means "from this time to the time of the next symbol, use the time-function generated by the usual model simulation. Therefore, if $V_i$ has the value '*', and if the normal simulation of var is v(t), then the TIME_TRANSITION function, between times $T_i$ and $T_i+1$, is equivalent to appending the equation:

$$var = f(t)*V_i+1+(1-f(t))*v(t)),$$

where
v(t) is defined by the usual model equation for var, and $$f(t)=(t-T_i)/(T_i+1-T_i).$$

A further example completes the description of the TIME_TRANSITION function. Suppose, in a condition or implied part of a constraint, the following expression appears Water=TIME TRANSITION(10,20,30,45,*,3.5,—,0).

This implies the following table of values:

| Time | Value |
| --- | --- |
| 10 | * |
| 20 | 3.5 |
| 30 | — |
| 45 | 0 |

In the example, Water would take on its usual simulation values until time=10. Between time=10 and time=20, the variable would be a weighted average of its normal simulation value and the specified value of 3.5, according to the following formula:

$$\text{Water}=f_{10,20}(t)*3.5+(1-f_{10,20}(t))*\text{Water}_{unualsimulation},$$

where
$f_{10,20}(t)=(\text{time}-10)/(20-10)$.

In other words, between time=10 and time=20, the variable will "taper" from normal simulation values toward the fixed value of 3.5, attaining the value 3.5 at time=20. Because the normal simulation values will, in general, continue to change after time=10, the resulting trajectory will not be a straight line.

Between time=20 and time=30, the variable will taper back towards its normal simulation trajectory. That is, the first symbol '—' encountered has the same effect as the symbol '*' in the interval before the symbol.

The difference between '—' and '*' is revealed in the period after their occurrence. In the first example, at time=30, the normal simulation value for the variable Water will be saved, and the constrained simulation will descend (or ascend, if that value is negative) from the saved value, following a sloped straight line to reach zero at time=45. This is implemented by the following formula:

$$\text{Water}=f_{30,45}(t)*0+(1-f_{30,45}(t))* \text{ Water as simulated at } t30,$$

where
$f_{30,45}(t)=(\text{time}-30)/(45-30)$

Because the preceding expression for the variable Water is a weighted average of two constants, it forms a straight line (or "ramp").

In general, the TIME_TRANSITION function is implemented as follows. The function is recognized by standard parsing techniques, and the times $T_i$ and values $V_i$ are stored as tree structures, in a manner similar to that described above for equations.

During a simulation model run, when values are required from the TIME_TRANSITION function, either to passively test a constraint or to actively test a constraint, the output is always equal to:

$$OUTPUT = (1 - f(t)) * PREV + f(t) * NEXT,$$

where $$f(t) = (t - T_p)/(T_n - T_p)$$

and where $T_p$=the time argument $T_i$ of the TIME_TRANSITION function just preceding the current time t, and $T_n$ =the next time argument $T_i+1$ of the TIME_TRANSITION function.

That is, $T_p <= t <= T_n$.

The variables PREV and NEXT may be numbers or functions of time, and are defined according to the table in FIG. 12.

In FIG. 12, the current time t is always in the interval between $T_i$ and $T_i+1$, S is the sampled value set in the previous interval (according to the right-most column) and m(t) is the output of the usual model equations for the variable to which the TIME_TRANSITION function applies. Note that $V_i$ and $V_i+1$ are used as PREV and NEXT only when they have numerical constant values; thus the equation remains well defined even though $V_i$ may in general have the special values '*' and '*'.

A data structure retaining dynamic information about a model and the time transition table is shown in "C" code in Appendix A, incorporated by reference. Some of the information contained in the data structure is in place after the constraints have been parsed to form parse trees. In addition, some information is filled in at the beginning of each simulation. The fill in may be accomplished by a routine called functioninit_transition, set forth in Appendix B, incorporated by reference. As the simulation progresses, the time transitions are used to turn on and turn off testing of the individual constraint tests. The simulation itself is placing information on the stack, addressed with this function as fstack. The purpose of this function is to generate a value, which the simulation model compares with the model generated value at that time. The model generated value is fstack[−1] coming into the function set forth in Appendix C, incorporated by reference.

The "C" code set forth in Appendix D, incorporated by reference, illustrates how time transition constraints are implemented by forcing them to be true.

Other Constraint Types

The TIME_TRANSITION function is only an example of the more general technique of defining constraint functions. Other kinds of functions could be useful as could pattern recognition techniques for defining constraint conditions. For example, using pattern recognition, one might define a constraint such as constraint_x THE_CONDITION var1_oscillates IMPLIES var2_oscillates, where the expression var1 oscillates would, in passive mode, detect whether the variable var1 conforms to some criteria of significant oscillation (perhaps within a specified range of frequencies). In active mode, the same expression would force var1 to oscillate in a way that conforms to the criteria. In both cases, var2 would then be examined to see it conforms to the criteria specified in the definition of the condition var2 oscillates.

One also could specify linearity of behavior (strict or approximate superposition of multiple modes) via a constraint such as contraint_y THE_CONDITION (var1_steps AND var2_oscillates)

IMPLIES var_steps_and_oscillates, where the definition of var_steps_and_oscillates would specify the sum of the responses expected from the separate application of the condition var1_steps and the condition var2_oscillates. The above constraint would express belief (or requirement) that the existence of oscillations in var2 should not cancel the effect of a step change in var1; that is, that the specified bit of reality is well described as a linear system.

Finally, it should be noted that the the classic idea of statistical consistency of a model, based on data from the reality being modeled, becomes a limiting case of the more general constraint technique. That is, normal statistical validity becomes constraint_statistical_consistency
THE_CONDITION null
IMPLIES model_behavior_consistent_with_data, where "null" is always true, implying only passive testing of the model under normal behavior, and "model_behavior_consistent_with_data" is defined as some statistical measure lying within a range of values indicating the desired level of statistical confidence.

Conceptually, a wide variety of tests can be expressed as constraint knowledge. Some of the following categories include examples already given.

Plausible Sensitivity

For any given change in an input or internal variable (for example, a step change in a parameter, or the ramping of a variable to another value, or the oscillation of an input as a specified sine wave) the response of each variable in the model should be plausible and realistic. This is achieved by defining one constraint for each test input. The output specification is then a boolean expression which is true when each variable conforms to its range of plausible responses.

Limiting Cases

This is a special kind of plausible sensitivity test in which the changes to the inputs are extreme, e.g., the inputs are reduced to zero, or forced to very large values, or caused to oscillate with extreme excursions. Here the values in the input specifications are at definitional or plausible limiting values.

Alternative-Baselines

Two kinds of test inputs operate simultaneously. An alternative baseline is established by "permanently" changing one or more inputs. The alternative baseline may employ different responses from other test inputs. Thus, alternative baseline tests are simply constraints of the usual kind, with extra inputs to establish the new baseline. For example, the reduction of factory labor to zero may not reduce factory output to zero if the factory is totally automated, and if only the short-term response is considered.

Historical Cases

If a wide variety of historical situations are known, each episode may be treated as a constraint, thus avoiding simulating the model over the entire historical interval that includes the interesting moments. This saves time and effort.

User Interaction

The user controls the application of constraints to the model in several ways. The user determines whether a given constraint is to be applied actively or only passively. The constraint environment reports back to the user and/or stores the results of passive constraints (i.e., indicates whether the constraint has or has not been satisfied and at what times). Any mismatches between the constraints and the behavior of the model (whether in active or passive mode) are reported to the user citing the constraint, the offending variable, and the times at which the variable passes from conformance to non-conformance, or the reverse.

It may be difficult for a user to spontaneously think of constraint knowledge, since such knowledge is usually thought of on an ad-hoc basis during the creation of models, or in (informally) testing existing models. The simulation system can help the user, even before the model exists, using only a list of concept names (variable names, or ideas which may become variables in the model). The simulation system presents (one at a time) each concept name, and ask which of the other concepts would be affected if the stated concept were to suddenly become zero. The user's reponses define one or more constraints. Similarly, the simulation system may inquire about the consequences of a stated concept rising suddenly by a small amount, growing without bound, oscillating, etc. The end benefit is to make explicit and routine a practice (comparison of a model with constraint knowledge) which is now implicit, ill-defined, and seldom appied with thoroughness.

Other embodiments are within the following claims.

What is claimed is:

1. A computer-based method for aiding a user to validate a computer-based simulation model of the kind which simulates a multiple variable system using a suite of equations, comprising
storing user-entered constraint knowledge defining (a) possible conditions of variables of the multiple variable system, the constraint knowledge being separate from the suite of equations, and (b) corresponding expected constraints on consequences of variables of the system,
automatically applying the possible conditions of variables to the suite of equations to produce test consequences on variables of the system, and
automatically analyzing the test consequences with respect to the constraints as an indication of the validity of the simulation model.

2. The method of claim 1 further comprising
providing a user interface that includes a constraint language for enabling a user to express constraint definitions as part of said constraint knowledge, said constraint language including a condition token for indicating the presence in a constraint definition of a statement about a condition of a variable, and a consequences token for indicating the presence in a constraint definition of a statement about a consequence on a variable of the system.

3. The method of claim 2 wherein said constraint language permits said user to express statements about the condition of a variable in the form of a variable name, followed by an expression, followed by an expression or by a token and an expression.

4. The method of claim 2 wherein said constraint language permits said user to express statements about the conditions which are logical concatenations of simpler condition statements.

5. The method of claim 2 wherein said constraint language permits said user to express time transition statements about the conditions and consequences which indicate how variables change over time.

6. A computer-based method for passive testing of the validity of a simulation model of the kind which simulates a multiple variable system using a suite of equations, said method comprising
storing constraint knowledge in the form of constraints each of which embodies information about the expected consequences on variables of said system which may be occasioned by assumed conditions of variables of said system, the constraint knowledge being separate from the suite of equations,
while running said simulation model, determining when values of variables satisfy conditions defined in said constraints,
thereafter determining when values of variables do and do not satisfy corresponding consequences defined in said constraints.

7. A computer-based method for active testing of the validity of a simulation model of the kind which simulates a multiple variable system using a suite of equations, said method comprising
storing constraint knowledge in the form of constraints each of which embodies information about the expected consequences on variables of said system which may be occasioned by assumed conditions of variables of said system, the constraint knowledge being separate from the suite of equations,
deriving from said constraint knowledge constraint equations for forcing said assumed conditions to exist,
appending said constraint equations to said simulation model,
while running said simulation model, determining when values of variables do and do not satisfy corresponding consequences defined in said constraints.

* * * * *

UNITED STATES PATENT AND TRADEMARK OFFICE
CERTIFICATE OF CORRECTION

PATENT NO. : 5,446,652

DATED : August 29, 1995

INVENTOR(S) : David W. Peterson et al.

It is certified that error appears in the above-identified patent and that said Letters Patent is hereby corrected as shown below:

On the title page, item [56], insert
In the References Cited section, the below-listed initialed references were not listed on the cover sheet:

AQ    Lee et al., "An Executable Language for Modeling Simple Behavior", IEEE Transactions on Software Engineering, Vol. 17, no. 6, June 1991, pp. 527-543.

AR    Denney, "Test-Case Generation from Prolog-Based Specifications", IEEE Software, 1991, Schlumberger Well Services.

AS    Roberts et al., "Modelling the Epidemiological Consequences of HIV Infection and AIDS: A Contribution from Operational Research", J.Opl.Res.Soc., Vol. 41, No. 4, pp. 273-289, 1990.

AT    Leveson et al., "The Use of Self Checks and Voting in Software Error Detection: An Empirical Study", IEEE Transactions on Software Engineering, Vol. 16, No. 4, April 1990, pp. 432-434.

AU    Roberts et al., "Modelling the Epidemiological Consequences of HIV Infection and AIDS: A Contribution from Operational Research", J.Opl.Res.Soc. Vol. 41, No. 4, pp. 273-289, (1990).

AV    Sorensen, "Thought Experiments", American Scientist, Vol. 79, May-June 1991, pp. 250-263.

AW    Fu, "Causim: A Rule-Based Causal Simulation System", Transactions, Vol. 7, No. 3, pp. 251-263.

UNITED STATES PATENT AND TRADEMARK OFFICE
CERTIFICATE OF CORRECTION

PATENT NO. : 5,446,652
DATED : August 29, 1995
INVENTOR(S) : David W. Peterson et al.

It is certified that error appears in the above-identified patent and that said Letters Patent is hereby corrected as shown below:

In Col. 2, line 22, "lock" should be --block--.

In Col. 2, line 39, after "11" insert --shows--.

In Col. 8, lines 14-15, "TIME TRANSITION" should be --TIME_TRANSITION--;

In Col. 8, line 56, "t30" should be --t=30--.

In Col. 9, line 14, "Ti" should be --$T_i$--.

In Col. 9, line 29, " '*' " should be -- '-". --.

In Col. 10, line 18, "the the" should be --the--.

In Col. 11, line 34, "appied" should be --applied--.

Signed and Sealed this

Fifteenth Day of October, 1996

BRUCE LEHMAN

*Attest:*

*Attesting Officer*  Commissioner of Patents and Trademarks